United States Patent
Foucoin

(10) Patent No.: US 10,323,706 B2
(45) Date of Patent: Jun. 18, 2019

(54) SLIDING CALIPER DISK BRAKE INCLUDING A CENTRAL RETURN SPRING OF AN EXTERIOR BRAKE SHOE INCLUDING WEAR PLAY COMPENSATION MEANS, SPRING AND REPLACEMENT KIT

(71) Applicant: CHASSIS BRAKES INTERNATIONAL B.V., Amsterdam (NL)

(72) Inventor: Alexandre Foucoin, Montevrain (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 31 days.

(21) Appl. No.: 14/879,513

(22) Filed: Oct. 9, 2015

(65) Prior Publication Data

US 2016/0102722 A1    Apr. 14, 2016

(30) Foreign Application Priority Data

Oct. 10, 2014  (FR) ...................................... 14 59733

(51) Int. Cl.
   *F16D 65/54*      (2006.01)
   *F16D 55/2265*    (2006.01)
   *F16D 65/097*     (2006.01)

(52) U.S. Cl.
   CPC ....... *F16D 65/543* (2013.01); *F16D 55/2265* (2013.01); *F16D 65/0979* (2013.01)

(58) Field of Classification Search
   CPC ............... F16D 65/543; F16D 65/0979; F16D 55/2265; F16D 65/0977; F16D 65/0978; F16D 65/0972; F16D 55/227
   See application file for complete search history.

(56) References Cited

U.S. PATENT DOCUMENTS

| 4,364,455 A | * | 12/1982 | Oshima ................. F16D 65/095 188/1.11 W |
| 5,022,500 A | * | 6/1991 | Wang .................... F16D 55/226 188/71.1 |
| 6,179,095 B1 | * | 1/2001 | Weiler .................. F16D 55/226 188/72.3 |

(Continued)

FOREIGN PATENT DOCUMENTS

DE    10 2008 058265 A1    5/2010
FR         2 925 636 A1    6/2009

(Continued)

OTHER PUBLICATIONS

FR Search Report, dated Jun. 12, 2015, from corresponding FR application.

*Primary Examiner* — Xuan Lan Nguyen

(74) *Attorney, Agent, or Firm* — Young & Thompson

(57) ABSTRACT

A sliding caliper disk brake (10) that includes an exterior brake shoe (18E) mounted to slide in the fixed support of the brake, wherein the disk brake includes a central exterior spring (48E) for returning the exterior brake shoe (18E) to its inactive position that is fixed to an associated central portion (63) of the exterior brake shoe (18E) and a front portion (50) of which is fixed axially to an associated central portion (58) of the fixed support (14). For returning it to its inactive position, the interior brake shoe is constrained to move axially with the brake piston.

26 Claims, 5 Drawing Sheets

(56) References Cited

U.S. PATENT DOCUMENTS

| | | | |
|---|---|---|---|
| 8,397,880 B2 * | 3/2013 | Chelaidite | F16D 65/0972 |
| | | | 188/73.31 |
| 8,517,152 B2 | 8/2013 | Zenzen et al. | |
| 2009/0159376 A1 | 6/2009 | Rossignol et al. | |
| 2013/0256068 A1 * | 10/2013 | Hazeki | F16D 55/226 |
| | | | 188/72.4 |

FOREIGN PATENT DOCUMENTS

| | | | | |
|---|---|---|---|---|
| FR | 3004500 A1 | | 10/2014 | |
| JP | 2006308092 A | * | 11/2006 | F16D 65/097 |
| WO | 03/027526 A1 | | 4/2003 | |

* cited by examiner

SLIDING CALIPER DISK BRAKE INCLUDING A CENTRAL RETURN SPRING OF AN EXTERIOR BRAKE SHOE INCLUDING WEAR PLAY COMPENSATION MEANS, SPRING AND REPLACEMENT KIT

TECHNICAL FIELD OF THE INVENTION

The invention relates to a motor vehicle sliding caliper disk brake.

The invention notably relates to a return spring of an exterior brake shoe including means for compensating the wear play of a friction lining of the brake shoe through plastic deformation.

TECHNICAL BACKGROUND OF THE INVENTION

The invention relates more particularly to a motor vehicle disk brake of the type described and shown in French patent application no. FR-A1-3004500, which includes:
- a brake disk that lies in a plane transverse to an axially oriented axis of rotation of the disk;
- a support fixed relative to a chassis of the vehicle,
- two brake shoes, interior and exterior, each of which includes a friction lining a transverse friction face of which cooperates with an associated braking track of the disk, each brake shoe being mounted to slide axially in the support between an active position in which the friction face bears against the associated annular track of the disk an inactive position in which the friction face is spaced axially from the associated annular track of the disk by a particular operating clearance;
- means for elastically returning each brake shoe to its inactive position, which comprise a return spring disposed between the brake shoe and the fixed support, for example.

In a disk brake, the sliding of the brake shoes toward their active position is driven by a piston. The two brake shoes, interior and exterior, then clamp the disk strongly to slow down its rotation. The braking operation is therefore an active operation.

The brake shoes are pushed back toward their inactive position by the rotating disk. This is therefore a passive operation.

However, it can happen that the disk does not push the brake shoes back with sufficient force to separate them from the disk by a sufficient distance. For example, this can occur if the sliding of the brake shoes is of insufficient quality or even jammed, or if the design of the shoe itself creates "restitution".

Although the brake shoes are no longer clamped actively against the disk, each of the annular tracks of the latter nevertheless rubs at all times against the friction lining carried by the associated brake shoe. The friction linings are therefore subjected to premature nonfunctional wear.

Moreover, this permanent friction is liable to cause heating that is harmful for some members of the disk brake.

This permanent friction also generates a residual torque that opposes the rotation of the disk. This increases the fuel consumption of the vehicle as well as degrading the performance of the vehicle.

To solve these problems of wear and heating, the aforementioned document proposes a disk brake in which, for each of the two shoes, there are two matched return springs, each of which includes means for compensating wear play of the friction lining of the brake shoe that deform plastically if the travel of the brake shoe to its active position is greater than said particular operating clearance.

To this end, a return spring includes at least one axially oriented section that is elastically deformable in traction between a rest state and a state of maximum elongation the value of which is equal to the particular operating clearance, the spring including at least one section deformable plastically by an axial traction force, forming said wear play compensating means, this plastically deformable section being conformed so as to be stretched plastically if the travel of the brake shoe to its active position is greater than the particular operating clearance.

The document WO-A1-027526 describes and shows one design of a brake shoe return spring.

The invention aims to improve the design and the performance of such return springs.

In such a brake in which each of the interior and exterior brake shoes is equipped with a pair of return springs, there may sometimes be encountered problems with balancing the sliding brake caliper relative to the disk, a brake shoe pressed against the disk possibly causing some residual torque.

Moreover, when acted on by the return springs with which it is equipped, it may also in some cases be found that the interior brake shoe—with which the front face of the brake piston cooperates—causes axial depression of the piston in its bore. It is therefore necessary to use return springs with different mechanical characteristics (load and stiffness) for the exterior and interior brake shoes.

The invention aims to remedy these disadvantages by proposing a new design of the return spring means of a sliding caliper disk brake, notably of the exterior brake shoe.

BRIEF SUMMARY OF THE INVENTION

To this end, the invention proposes a motor vehicle disk brake that includes:
- a brake disk that lies in a plane transverse to an axially oriented rotation axis of the disk;
- a support fixed relative to a chassis of the vehicle;
- a caliper that is mounted to slide axially relative to the fixed support and that includes:
  - a rear casing in which a brake piston is mounted to slide axially to cooperate, toward the front, with an interior brake shoe that includes a friction lining a transverse front friction face of which cooperates with an associated braking track of the disk;
  - a front flange, axially fixed to the casing to cooperate with an exterior brake shoe that includes a friction lining a transverse rear friction face of which cooperates with an associated braking track of the disk;
  - the exterior brake shoe being mounted to slide axially in the fixed support between a rear active position in which the friction face bears against the associated annular track of the brake disk and a front inactive position in which the transverse rear friction face is spaced axially from the associated annular track of the brake disk by a particular operating clearance, characterized in that the disk brake includes an exterior return spring for returning the exterior brake shoe to its inactive position, in that a rear connecting portion of the exterior return spring is fixed, directly or indirectly, to an associated central portion of the exterior brake shoe, and in that a front portion of the exterior return spring is fixed axially to an associated central portion of the fixed support.

In accordance with other features of the disk brake:

the interior brake shoe is constrained to move axially with the brake piston;

the exterior return spring for returning the exterior brake shoe to its inactive position includes means for compensating wear play of the friction lining of the exterior brake shoe that are deformed plastically when the movement of the exterior brake shoe in an axial direction of movement as far as an active braking position is greater than said particular operating clearance;

the associated central portion of the exterior brake shoe is substantially in line with the sliding axis of the brake piston;

the associated central portion of the fixed support is constituted by a central section of a beam of the fixed support that lies in a front plane orthogonal to the sliding axis of the brake piston, substantially in line with this sliding axis of the brake piston;

the front flange of the caliper includes two transversely spaced lateral parts that are symmetrical with respect to the sliding axis of the brake piston and delimit between them a central recess in which the exterior return spring is arranged;

the means that are deformed plastically include a plastically deformable section that is formed by an accordion fold that extends between the rear connecting portion and the front fixing portion of the exterior return spring;

the exterior return spring includes successively at least:
  the front portion for fixing the exterior return spring to the fixed support;
  a second rigid branch a proximal end of which is connected to the fixing portion by a first bend plastically deformable about a first deformation axis orthogonal to the axial direction of movement of the exterior brake shoe and parallel to the plane in which the second rigid branch lies;
  a third rigid branch a proximal end of which is connected to a distal end of the second rigid branch by a second bend plastically deformable about a second deformation axis parallel to the first deformation axis;
  a fourth rigid branch a proximal end of which is connected to a distal end of the third rigid branch by a third bend plastically deformable about a third deformation axis parallel to the first deformation axis, and that is fixed to the associated central portion of the exterior brake shoe to constitute the rear connecting portion of the exterior return spring;

and each rigid branch is a strip that lies globally in a plane parallel to the first deformation axis;

and the fourth rigid branch is axially spaced relative to the fixing portion;

the front portion for fixing the exterior return spring to the fixed support includes a first rigid branch that is a strip that lies in a plane parallel to the first deformation axis and the proximal end of the second rigid branch is connected to a distal end of the first rigid branch by the first plastically deformable bend;

the front portion for fixing the exterior return spring to the fixed support includes a rigid lug that extends a proximal end of the first rigid branch to constitute a bend forming a hook a concave portion of which receives the central section of the beam of the fixed support;

each rigid branch is straight;

each rigid branch includes stiffening means;

each plastically deformable bend includes an area of weakened mechanical properties;

each plastically deformable bend is a bent portion of a strip including a window oriented parallel to the first deformation axis;

the exterior return spring is produced in one piece by cutting and shaping a sheet of material;

the exterior return spring is produced in one piece by cutting, pressing and bending a sheet of metal;

the rigid branches and the bends are produced in one piece by cutting, pressing and bending a strip of constant width;

in a state preceding any plastic deformation of the bends, the first rigid branch and the second rigid branch form an angle equal to the angle that the second rigid branch and the third rigid branch form and equal to the angle that the third rigid branch and the fourth rigid branch form;

the exterior return spring is made from a material selected from a group including stainless steel, X2CrNbCu21 steel, 304L steel, gold, lead, a synthetic material, a synthetic material with a polymer matrix reinforced by natural or synthetic fibers;

the exterior return spring is made from a material the breaking strain of which is between 30% and 60%, the tensile strength of which is between 400 MPa and 1000 MPa and the 0.2% offset strain of which is between 0 and 500 MPa;

the exterior return spring is made from a material the breaking strain of which is between 40 and 60%, the tensile strength of which is between 400 MPa and 700 MPa, and the 0.2% offset strain of which is between 150 and 400 MPa;

the exterior return spring is made from a material the breaking strain of which is between 50 and 60%, the tensile strength of which is between 400 MPa and 600 MPa, and the 0.2% offset strain of which is between 200 and 300 MPa;

the exterior return spring includes a functional plate connected to the front fixing portion that lies in a front plane orthogonal to the sliding axis of the brake piston;

the exterior return spring is produced in one piece with the functional plate;

the exterior brake shoe includes at least one lateral lug for guiding sliding thereof that is received in an axial slide of the fixed support;

the disk brake includes a slider that espouses the walls of the slide and is fixed to the fixed support.

The invention also proposes a return spring of an exterior brake shoe for a disk brake in accordance with the invention.

The invention further proposes a replacement kit for a motor vehicle disk brake in accordance with the invention, characterized in that it includes at least one exterior brake shoe and an exterior return spring matched to said exterior brake shoe. The kit may further include two "radial" springs for mounting the exterior brake shoe.

BRIEF DESCRIPTION OF THE FIGURES

Other features and advantages of the invention will become apparent on reading the following detailed description, to understand which reference should be made to the appended drawings, in which.

DETAILED DESCRIPTION OF THE FIGURES

In the remainder of the description, elements having an identical structure or similar functions are designated by the same references.

There are adopted, in a non-limiting way and without reference to terrestrial gravity, axial, vertical and transverse orientations referred to the "A,V,T" trihedron in the figures.

The axial orientation "A" is directed from the back toward the front, parallel to a rotation axis "B" of the disk 12.

The horizontal plane is defined as being an axial transverse plane.

Figure 1:
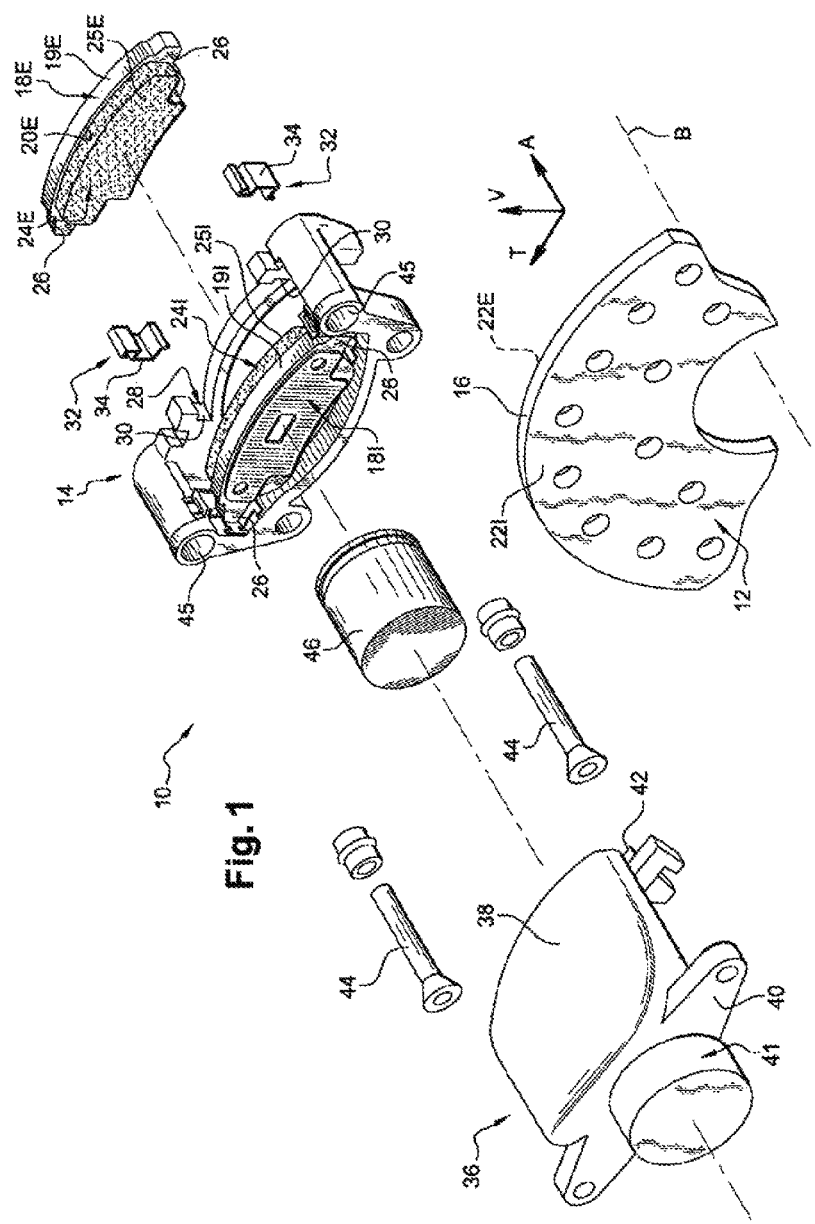
FIG. 1 is a diagrammatic exploded perspective view that represents a disk brake in accordance with one embodiment of the invention.
Figure 2:
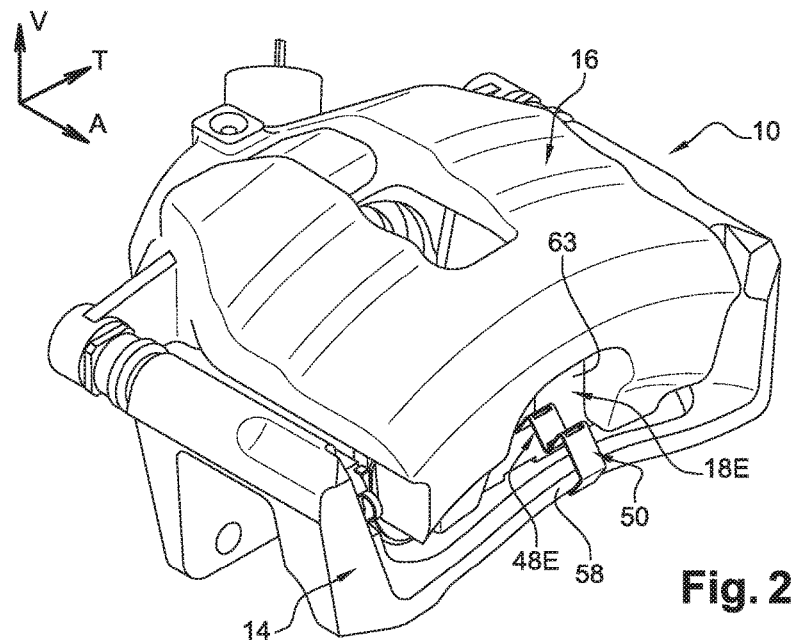
FIG. 2 is a detailed perspective view as seen from another angle of the disk brake in accordance with the invention the exterior brake shoe of which is equipped with an exterior return spring in accordance with the invention.

There is shown diagrammatically in FIG. 1 a motor vehicle disk brake 10. Here this is a "floating caliper" or "sliding caliper" disk brake 10.

As known in itself, the disk brake includes a disk 12 that is mounted to turn about an axially oriented rotational axis "B". The disk 12 is constrained to rotate with a wheel (not shown) of the motor vehicle.

The disk brake 10 includes a support 14, also known as a yoke, which is fixedly mounted relative to the chassis (not shown) of the vehicle. The fixed support 14 straddles a peripheral edge 16 of the disk 12.

Two opposite brake shoes 18I and 18E, rear and front (also referred to as the interior brake shoe 18I and the exterior brake shoe 18E), are mounted to slide axially in the support 14 on respective opposite sides of the disk 12.

The interior braking shoe 18I and the exterior braking shoe 18E have identical structures and guide arrangements on the support 14 that are symmetrical with respect to a median vertical transverse plane.

Hereinafter, with reference to the design of the brake shoe as such, only the rear exterior brake shoe 18E is described, the description being applicable to the front interior brake shoe 18I by interchanging the front and rear directions and the indices "I" and "E".

The exterior brake shoe 18E takes the form of a friction lining support vertical transverse plate 19E. The exterior brake shoe 18E has a rear face 20E that is oriented toward a facing front face 22E of the disk 12 which is in the form of an annular track. The front face 20E carries a friction lining 24E a vertical and transverse rear friction face 25E of which is adapted to cooperate with the face 22E of the disk 12.

Each of the opposite transverse ends of the exterior brake shoe 18E includes a lateral lug 26 that is mounted, with clearance, to slide in an associated slide 28 of an associated arm of the caliper 14.

Each slide 28 is axially oriented and, in section on a vertical transverse plane orthogonal to the axes A and B, has a "C" shape that is open transversely toward the associated lateral lug 26 of the brake shoe 18E. The slide 28 is delimited transversely by a globally vertical and axially oriented back 30.

In the example shown in the figures, a slider 32 is disposed transversely between each lateral lug 26 and the associated slide 28.

Each slider 32 is formed by a "C"-section leaf spring that espouses the walls of the associated slide 28. The slider 32 therefore includes a vertically and axially oriented back 34 that is arranged to face the back 30 of the slide 28.

The slider 32 allows a particular degree of movement of the exterior brake shoe 18E in the fixed support 14, that is to say, generally but not in any limiting manner, an axial sliding movement and a transverse sliding movement accompanying the rotation of the disk 12 on braking.

Figure 9A:
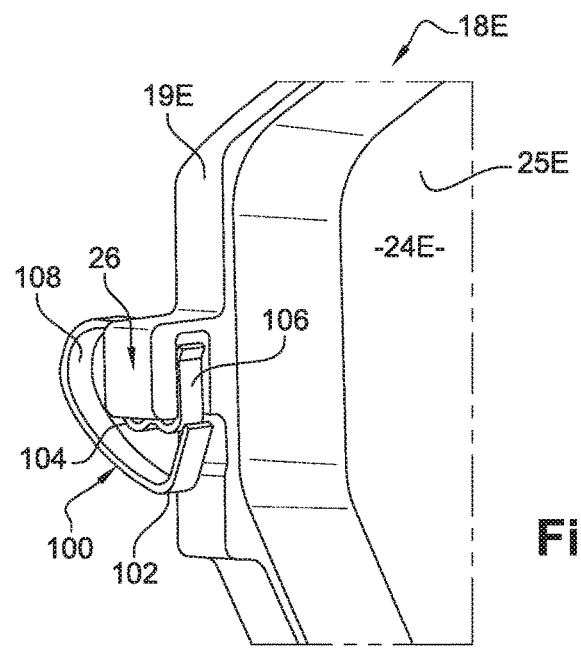
FIG. 9A is a diagrammatic perspective view that shows in detail a lug of a brake shoe equipped with a "radial" spring.
Figure 9B:
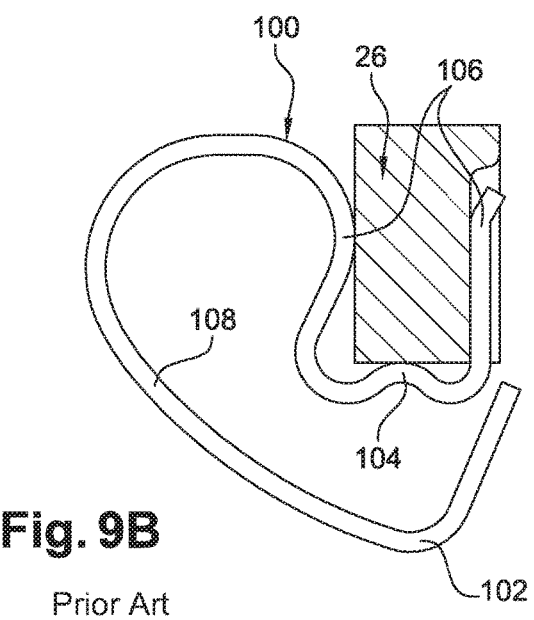
FIG. 9B is a sectional detail view of FIG. 9A.

Without departing from the scope of the present invention, and in accordance with a design that is not shown, each lateral lug 26 may be equipped with a so-called mounting spring, of the type described and shown in the document FR-A1-2.925.636 and shown in FIGS. 9A and 9B.

The exterior brake shoe 18E is therefore mounted to slide in the fixed support 14 in an axial direction parallel to the rotation axis B of the disk 12 and over an operating travel between:

a rear active position in which the rear transverse friction face 25E of the friction lining 24E bears against the facing face 22E of the disk 12; and a front inactive position in which the rear transverse friction face 25E of the friction lining 24E of the exterior brake shoe 18E is axially spaced from the associated face 22E of the disk 12, by a particular operating clearance "J1".

On braking, the clamping of the brake shoes 18I and 18E by moving them from their inactive position to their active position is driven by a sliding brake caliper 36 of the disk brake 10.

As known in itself, the caliper 36 includes a caliper body 38 that extends axially above and covers the support 14 and a rear flange 40 and a front flange 42 that extend radially toward the axis "B" from the rear and front edges of the caliper body 38.

The front flange 42 faces the exterior brake shoe 18E and the rear flange 40 faces the interior brake shoe 18I.

Here the caliper 36 is mounted to slide axially relative to the fixed support 14 by means of two parallel slide pins 44 each of which is received in and slides in an associated axial bore 45 of the fixed support 14.

As known in itself, the rear flange 40 of the caliper 36 carries at least one casing 41 that delimits a bore 45 in which an axial piston 46 is slidably mounted a front transverse bearing face of which is adapted to cooperate, on braking, with the facing transverse face of the interior brake shoe 18I to urge it axially forward so as to exert an axial clamping force on the rear transverse friction face 25I of the friction lining 24I to clamp it against the facing face 22I of the disk 12.

By reaction, the caliper 36 slides axially toward the rear, and, in a symmetrical manner, the front flange 42 applies a force to the front exterior brake shoe 18E to clamp the rear transverse friction face 25E of the friction lining 24E of the exterior brake shoe 18E against the facing front face 22E of the disk 12.

When, after braking, the piston 46 ceases to apply a force to the interior brake shoe 18I, the brake shoes 18I and 18E are generally returned from their active position to their inactive position by the rotation of the disk 12 and its natural run out, which "pushes back" each brake shoe to its inactive position.

Nevertheless, in some cases, it is found that the repulsion force exerted by the disk 12 is insufficient to push each of the brake shoes 18I and 18E back into its respective inactive position. The friction lining 24I, 24E of the brake shoes 18I, 18E therefore continues to rub against the disk 12 although there is no clamping of the friction linings of the brake shoes by the caliper 36.

Following braking, to guarantee that the exterior brake shoe 18E returns to an inactive position, the disk brake 10 in accordance with the invention is equipped with return spring means for elastically returning the exterior brake shoe 18E to its inactive position.

These return spring means take the form of a central exterior return spring 48E that is disposed between the exterior brake shoe 18E and the fixed support 14.

A first embodiment of an exterior return spring 48E in accordance with the invention is described next.

The exterior return spring 48E takes the form of a strip of metal, for example steel, of rectangular section, the width of which extends horizontally and which is made by cutting, pressing and bending a sheet of stainless steel of constant thickness, for example.

Figure 3:
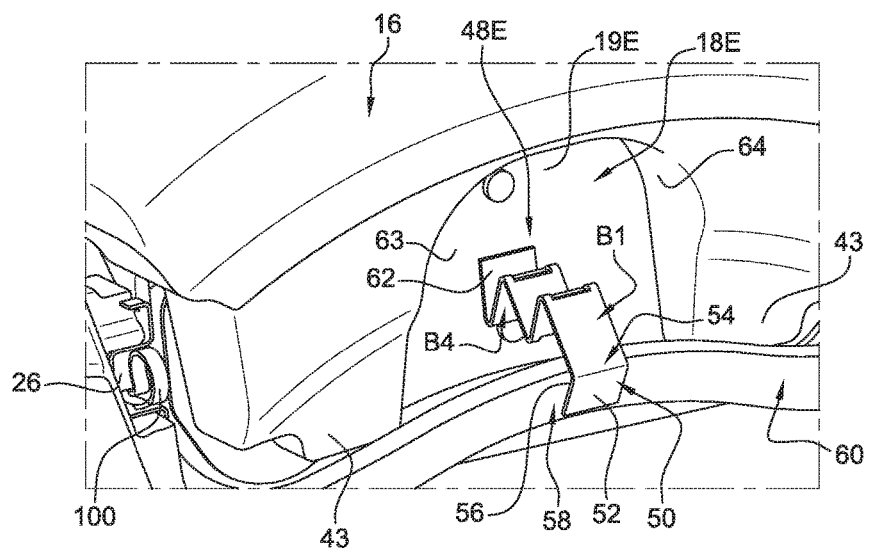
FIG. 3 is a view to a larger scale of the return spring from FIG. 4.
Figure 4:
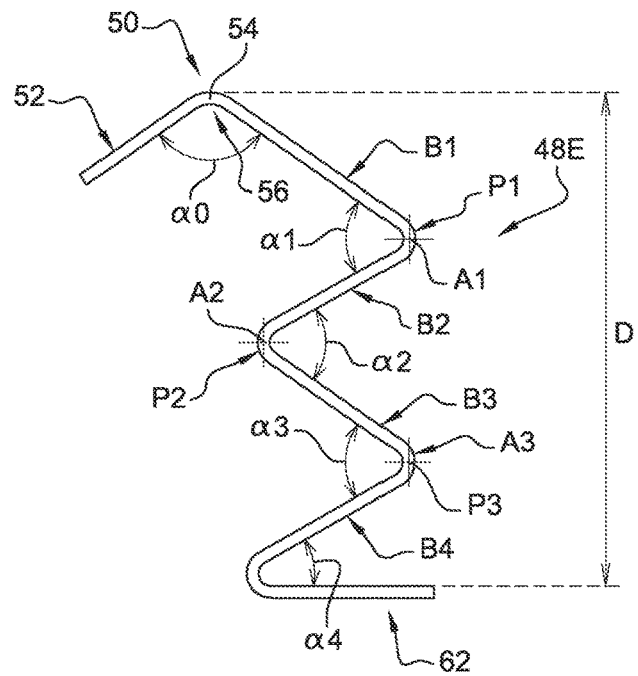
FIG. 4 is a side view to a large scale of the exterior return spring from FIG. 3.
Figure 5:
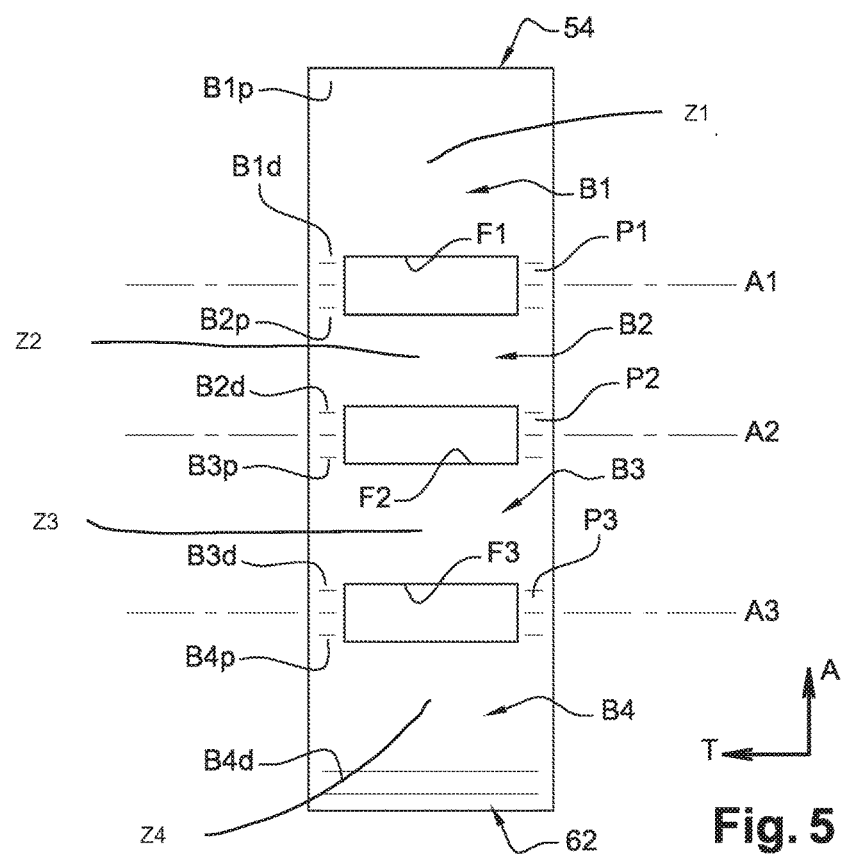
FIG. 5 is a right-hand side view of the exterior return spring from FIG. 4.

Referring in particular to FIGS. 3 to 5, the exterior return spring 48E includes a first front portion 50, in the general shape of an open "hook", forming the means for fixing the exterior return spring 48E to the fixed support 14.

The front portion 50 for fixing the exterior return spring 48E occupies a fixed axial position relative to the fixed support 14 and to the disk 12.

The front fixing portion 50 includes a rigid lug 52 that is extended by a rigid branch B1 to constitute a bend 54 forming a hook a concave portion 56 of which of obtuse angle α0 receives a central section 58 of a beam 60 of the fixed support 14.

The beam 60 extends globally horizontally in the transverse direction T between two transversely spaced lateral parts 43 of the flange 42 of the sliding caliper 36, which extend symmetrically with respect to the sliding axis of the brake piston 46 and delimit between them a central recess 64 in which the exterior return spring 48E in accordance with the invention is arranged.

The beam 60 extends in a front plane orthogonal to the sliding axis of the brake piston 46, substantially in line with the sliding axis of the brake piston 46.

The design of the front portion 50, cooperating with the profile of the central section 58 of the beam 60, is such that it guarantees the transmission of forces only along the axis A.

Starting from the front fixing portion 50, and to be more precise from the first rigid straight branch B1, the exterior return spring 48E is successively extended by three other rigid straight branches B2, B3 and B4 that form a plastically deformable accordion-folded section.

Each straight rigid branch Bi has a proximal end Bip relative to the front fixing portion 50 and a distal end Bid.

The first branch B1 therefore has its proximal end B1p connected to the lug 52 while its distal end B1d is connected to the second rigid branch B2.

The proximal end B2p of the second rigid branch B2 is connected to the distal end B1d of the first rigid branch B1 by a first bend P1 that is plastically deformable about a first deformation axis A1.

Like the first branch B1, the second rigid branch B2 is conformed as a strip in line with the first rigid branch B1.

In the mounted position of the exterior return spring 48E, the first deformation axis A1 is orthogonal to the axial direction A of movement of the exterior brake shoe 18E and is horizontal and transversely oriented.

In order for the first bend P1 to constitute a plastically deformable area, this portion is mechanically weakened, here by means of a window or opening F1 which here is an open cut-out of rectangular shape oriented along the axis A1.

The invention is not limited to this embodiment of the plastically deformable area constituting the bend P1, and any other means of modifying the mechanical characteristics of the material constituting this area to render it plastically deformable in the sense of the invention may be used, such as a reduction of the thickness of the material in this area, for example.

In the same way, the proximal end B3p of the third rigid branch B3 is connected to the distal end B2d of the second rigid branch B2 by a second plastically deformable bend P2 that is deformable about a second deformation axis A2 parallel to the first deformation axis A1.

The second bend P2 is a bent portion of the strip of material including a window F2.

Finally, the proximal end B4p of the fourth branch B4 is connected to the distal end B3d of the third rigid branch B3 by a third plastically deformable bend P3 allowing deformation about a third deformation axis A3 parallel to the first deformation axis A1.

The third bend P3 includes a window F3 similar to the windows F1 and F2.

The fourth rigid branch B4 is straight and is extended here by an active lug 62 intended to be connected directly or indirectly to the exterior brake shoe 18E (this is not limiting on the invention).

In the sense of the invention, the active lug 62 constitutes a rear connecting portion of the exterior return spring 48E that is fixed, here directly, to an associated central portion 63 of the exterior brake shoe.

Here the active lug 62 is produced by extending the strip constituting the branches Bi and extends from the distal end B4d of the fourth rigid branch B4 in a vertical plane orthogonal to the axis along which the exterior brake shoe 18E slides.

For example, the active lug 62A may include an axial hole or a plurality of holes (not shown) to enable it to be fixed to an associated part of the exterior brake shoe 18E, for example the front face of its friction lining support plate 19E.

The associated central portion 63 of the exterior brake shoe 18E to which the active lug 62 is fixed is substantially in line with the sliding axis of the brake piston 46.

By way of no limiting example, each of the branches Bi can be stiffened by a pressed area Zi formed in the body constituting each branch Bi.

The pressed area Z4 stiffening the fourth rigid branch B4 may be extended into the body of the active lug 62 so that the right-angle bend 66 that connects them is itself rigid to guarantee in service the acute angle conformation α4 between the fourth rigid branch B4 and the active lug 62.

In FIGS. 2 to 5, the exterior return spring 48E is represented in a "new" initial state, i.e. before any plastic deformation of the bends Pi.

In this new or initial state, the bend 54 and the active lug 62 are at an axial distance D from each other, i.e. spaced by a distance D indicated in FIG. 4.

By way of nonlimiting example, and as shown in the figures, the first rigid branch B1 and the second rigid branch B2 form between them an acute angle α1, the second rigid branch B2 and the third rigid branch B3 are of equal length and form between them an acute angle α2, and the third rigid branch B3 and the fourth rigid branch B4 form between them an acute angle α3.

The angles α1, α2, and α3 are substantially equal.

The rigid branch B4 and the active lug 62 form between them an acute angle α4 less than the angles α1, α2, and α3.

In a state of maximum plastic deformation of the exterior return spring 48E (not shown), corresponding to a state of maximum wear of the friction lining 25E, the three bends P1, P2 and P3 are plastically deformed about deformation axes A1, A2 and A3, respectively.

Each angle α1, α2 and α3 has then opened out so that the second branch B2 and the third rigid branch B3 are substantially axially in line with each other with an angle α2 the value of which is close to 180 degrees.

In the embodiment that has just been described, the exterior return spring 48 is produced in one piece by cutting, pressing and bending a strip of constant width and of rectangular section.

By way of example, the thickness of the strip of material is between 0.5 and 0.8 millimeter and the material is X2CrNbCu21 or 304L (X2CrNi18-9/X2CrNi19-11) stainless steel.

By way of example, the maximum movement corresponding to the maximum wear J2 is equal to approximately 14 millimeters.

In the new state of the exterior brake shoe 18E and the return spring 48E, the exterior brake shoe 18E is arranged axially in front of the disk 12 and the transverse front friction face 25E of the friction lining 24E is at a distance equal to the sum of:

the particular operating clearance "J1", and
a wear play "J2".

The exterior return spring 48E and its elastically deformable parts are then in the rest state.

When the exterior brake shoe 18E is urged toward its active position by the caliper 36, it first travels the stroke corresponding to the particular operating clearance "J1".

During this first portion of the stroke, the exterior brake shoe 18E entrains the active lug 62 of the exterior return spring 48E and the rigid branch B4 so as to tension elastically the exterior return spring 48E between the front portion 50 fixed to the support 14 and the active lug 62 fixed to the brake shoe 18.

The elastically deformable portions of the exterior return spring 48E then reach their state of maximum elongation.

The rear transverse face of the friction lining 24E of the exterior brake shoe 18E is then spaced from the associated face or annular track 22E of the brake disk 12 by a distance equal to the wear play "J2". The exterior brake shoe 18E therefore continues its axial stroke as far as its active position.

During this second part of the stroke, the plastically deformable bends Pi are subjected to a force that tends to cause angular deformations of the bends Pi about the associated deformation axes Ai.

The bends Pi are then deformed plastically, the elastic deformations of the plastically deformable parts being negligible compared to their plastic deformation.

At the end of braking, the exterior brake shoe 18E is returned to its inactive position by the bends reverting to a rest state.

The exterior brake shoe 18E is therefore again spaced from the disk 12 by a distance equal only to the particular operating clearance "J1", the wear play "J2" having been absorbed by the plastic deformation of the plastically deformable bends Pi.

The exterior return spring 48E therefore makes it possible to guarantee that the exterior brake shoe 18E is returned to its inactive position.

Moreover, the arrangement of the plastically deformable bends Pi makes it possible to avoid the clamping force to be exerted by the piston 46 to actuate the exterior brake shoe 18E to its active position becoming too high.

Moreover, by maintaining a constant operating clearance "J1" between the exterior brake shoe 18E in the inactive position and the disk 12, the response time of the braking system remains constant regardless of the wear of the friction lining 24E.

The function of the exterior return spring 48E is therefore to "eliminate" contact between the friction lining and the brake disk when no hydraulic braking pressure is applied to the piston 46.

For the purposes of choosing the material from which the return spring 48 is made, the breaking strain, the tensile strength and the 0.2% offset strain are preferably and by way of nonlimiting example chosen in the following ranges of values:

30<breaking strain<60%; preferably 40<breaking strain<60%; and more preferably 50<breaking strain<60%, 400<tensile strength<1000 MPa; preferably 400<tensile strength<700 MPa; and more preferably 400<tensile strength<600 MPa, 0<0.2% offset strain<500 MPa; preferably 150<0.2% offset strain<400 MPa; and more preferably 200<0.2% offset strain<300 MPa, where $1 \text{ MPa}=10^6 \text{ Pa}$.

To return the interior brake shoe 18I to its inactive rest position, the interior brake shoe 18I may be fixed to the brake piston 46 to move axially with it, for example by means of a "clipping" spring (not shown), that is to say an elastically nested spring. When the hydraulic pressure acting on the brake piston 46 is released, the axial rearward movement of the piston 46 in its bore entrains the interior brake shoe 18I and any residual friction torque between the interior braking shoe 18I and the brake disk 12 is eliminated.

With this design, it is not necessary to equip the interior brake shoe 18I with exterior return springs.

FIG. 9A shows diagrammatically a mounting spring 100 for a brake shoe that can be fitted to the lugs 26 of a brake shoe, notably the exterior brake shoe 18E, to mount and to guide the exterior brake shoe 18E in the associated axial slides 28 of the support 14, with or without the sliders 34.

As is known in itself, each shoe spring 100 includes a lower sliding branch 102 that cooperates with a horizontal lower face of the associated slide and applies to a horizontal upper facet of the lug 26 a force that causes it to bear vertically upward against a facing upper face of the slide 28.

The shoe spring 100 is commonly referred to as a "snail spring" and in the conformation shown in FIG. 9A includes a branch 104 bearing on the underside of a lower horizontal facet of the lug 26 of the exterior brake shoe 18E, this branch 104 forming part of a fixing branch or clip 106 which elastically clamps the lug 26 to fix the shoe spring 100 to the lug 26.

The shoe spring 100 further includes a curved branch 108 that connects the fixing branch 106 to the lower sliding branch 102, primarily providing the elasticity of the shoe spring 100.

Upon maximum complete wear of the friction lining, the exterior return spring 48E is deformed plastically and, like the worn exterior brake shoe 18E, must be replaced.

A set or kit for replacing a worn set of brake shoes therefore includes, for the exterior brake shoe, a new exterior brake shoe 18E as such and an exterior return spring 48E.

If the brake shoe is of the type equipped with shoe mounting springs 100, the replacement kit includes the new shoe equipped with its exterior return spring 48E and its two shoe springs 100, one for each of its two radial lugs 26.

The design of the exterior return spring 48E in accordance with the invention is not limited to the principal embodiment that has just been described.

It may notably vary significantly in terms of the design of the connecting part connecting the distal end B4d of the fourth rigid branch B4 with the exterior brake shoe 18E to act thereon directly or indirectly.

It may also vary in terms of the design of the front fixing part 50.

Figure 6:
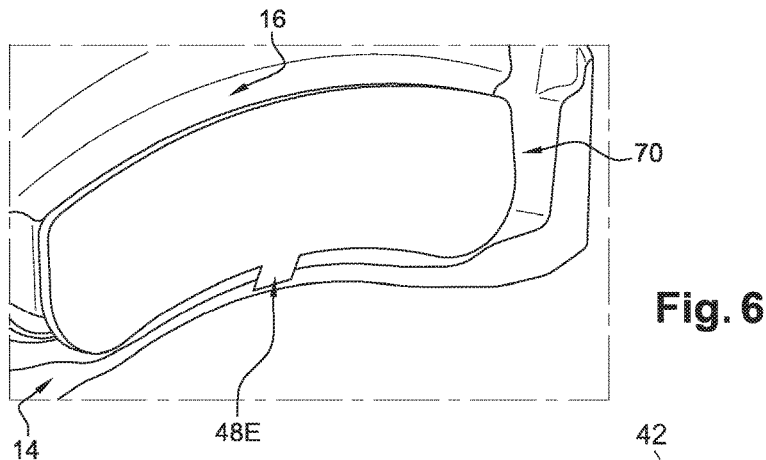
FIG. 6 is a view similar to that of FIG. 3 that shows a variant embodiment of the exterior return spring.
Figure 7:
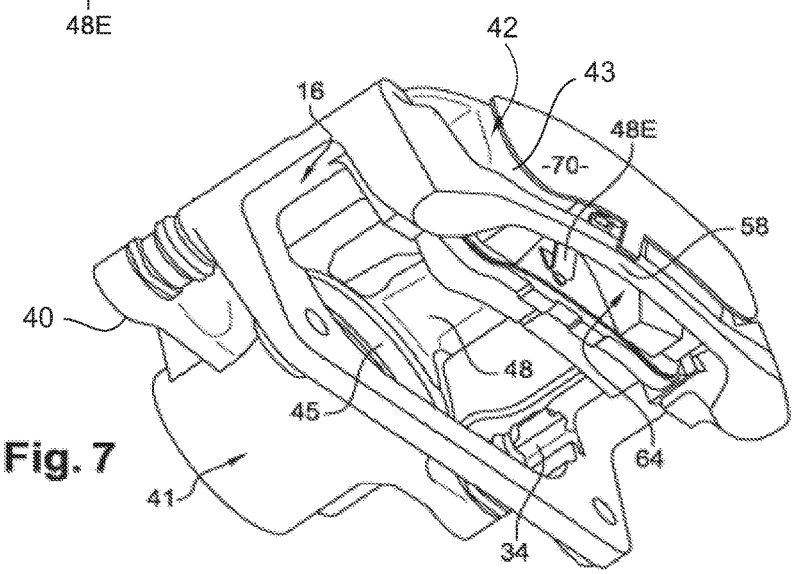
FIG. 7 is a perspective view from below that shows the arrangement of the exterior brake shoe and the exterior return spring from FIG. 7.
Figure 8:
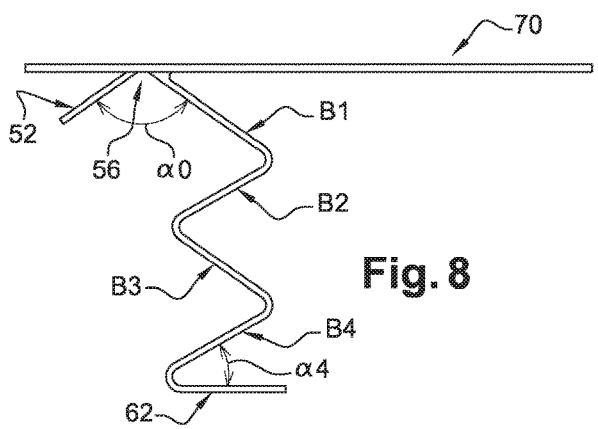
FIG. 8 is a lateral view to a large scale of the exterior return spring from FIGS. 6 and 7.

There is shown in FIGS. 6 and 7 a variant embodiment of the exterior return spring 48E in which the exterior spring includes a functional plate 70 connected to the front fixing portion 50 that extends in a front plane orthogonal to the sliding axis of the brake piston 46.

The exterior return spring 48E may be produced in one piece with the functional plate 70 or fixed to it, for example welded to it.

By way of nonlimiting example, the plate 70 may constitute a support for graphical representations such as markings or decoration. The conformation of the plate, the choice of its constituent material, etc. also make it possible to provide other functions of a technical nature associated with correct functioning of the brake.

The dimensions of the functional plate 70 are such that, regardless of the axial position of the caliper 16 and the exterior brake shoe 18E, the functional plate 70 never interferes with the surrounding parts of the caliper 16.

The invention claimed is:

1. A motor vehicle disk brake (10) that includes:
a brake disk (12) that lies in a plane transverse to an axially oriented rotation axis (A) of the disk;
a support (14) fixed relative to a chassis of the vehicle;
a caliper (36) that is mounted to slide axially relative to the fixed support (14) and that includes:
a rear casing (41) in which a brake piston (46) is mounted to slide axially to cooperate, toward the front, with an interior brake shoe (18I) that includes a friction lining (24I) a transverse front friction face (25I) of which cooperates with an associated braking track (22I) of the disk (12);
a front flange (42), axially fixed to the casing (41) to cooperate with an exterior brake shoe (18E) that includes a friction lining (24E) a transverse rear friction face (25E) of which cooperates with an associated braking track (22E) of the disk (12);
the exterior brake shoe (18E) being mounted to slide axially in the fixed support (14) between a rear active position in which said friction face (25E) bears against the associated annular track (22E) of the brake disk (12) and a front inactive position in which said transverse rear friction face (25E) is spaced axially from said associated annular track (22E) of the brake disk by a particular operating clearance (J1),
wherein the disk brake includes an exterior return spring (48E) for returning the exterior brake shoe (18E) to its inactive position, a rear connecting portion (62) of the exterior return spring (48E) is fixed, directly or indirectly, to an associated central portion (63) of the exterior brake shoe (18E), and a front portion (50) of the exterior return spring (48E) is fixed axially to an associated central portion (58) of the fixed support (14).

2. The disk brake as claimed in claim 1, wherein the interior brake shoe (18I) is constrained to move axially with the brake piston (46).

3. The disk brake as claimed in claim 1, wherein the exterior return spring (48E) for returning the exterior brake shoe (18E) to its inactive position includes means for compensating wear play (J2) of the friction lining (24E) of the exterior brake shoe (18E) that are deformed plastically when the movement of the exterior brake shoe (18E) in an axial direction of movement as far as an active braking position is greater than said particular operating clearance (J1).

4. The disk brake as claimed in claim 1, wherein said associated central portion (63) of the exterior brake shoe (18E) is substantially in line with the sliding axis of the brake piston (46).

5. The disk brake as claimed in claim 1, wherein said associated central portion of the fixed support (14) is constituted by a central section (58) of a beam (60) of the fixed support (14) that lies in a front plane orthogonal to the sliding axis of the brake piston (46), substantially in line with this sliding axis of the brake piston (46).

6. The disk brake as claimed in claim 1, wherein the front flange (42) of the caliper (36) includes two transversely spaced lateral parts (43) that are symmetrical with respect to the sliding axis of the brake piston (46) and delimit between them a central recess (64) in which the exterior return spring (48E) is arranged.

7. The disk brake (10) according to claim 3, wherein said means that are deformed plastically include a plastically deformable section (P1-B2-P2-B3-P3) that is formed by an accordion fold that extends between said rear connecting portion (62) and said front fixing portion (50) of the exterior return spring (48E).

8. The disk brake as claimed in claim 7, wherein the exterior return spring (48E) includes successively at least:
said front portion (50) for fixing the exterior return spring (48E) to the fixed support (14);
a second rigid branch (B2) a proximal end (B2p) of which is connected to the fixing portion (50) by a first bend (P1) plastically deformable about a first deformation axis (A1) orthogonal to the axial direction (A) of movement of the exterior brake shoe (18E) and parallel to the plane in which the second rigid branch (B2) lies;
a third rigid branch (B3) a proximal end (B3p) of which is connected to a distal end (B2d) of the second rigid branch (B2) by a second bend (P2) plastically deformable about a second deformation axis (A2) parallel to the first deformation axis (A1);
a fourth rigid branch (B4) a proximal end (B4p) of which is connected to a distal end (B4d) of the third rigid branch (B3) by a third bend (P3) plastically deformable about a third deformation axis (A3) parallel to the first deformation axis (A1), and that is fixed to said associated central portion (63) of the exterior brake shoe (18E) to constitute said rear connecting portion (62) of the exterior return spring (48E); each rigid branch (B2, B3, B4) is a strip that lies globally in a plane parallel to the first deformation axis (A1); and the fourth rigid branch (B4) is axially spaced (D) relative to the fixing portion (50).

9. The disk brake as claimed in claim 7, wherein the front portion (50) for fixing the exterior return spring (48E) to the fixed support (14) includes a first rigid branch (B1) that is a strip that lies in a plane parallel to the first deformation axis (A1) and the proximal end (B2p) of the second rigid branch (B2) is connected to a distal end (B1d) of the first rigid branch (B1) by the first plastically deformable bend (P1).

10. The disk brake as claimed in claim 9, wherein said associated central portion of the fixed support (14) is constituted by a central section (58) of a beam (60) of the fixed support (14) that lies in a front plane orthogonal to the sliding axis of the brake piston (46), substantially in line with this sliding axis of the brake piston, and the front portion (50) for fixing the exterior return spring (48E) to the fixed support (14) includes a rigid lug that extends a proximal end (B1p) of the first rigid branch (B1) to constitute a bend forming a hook a concave portion of which receives said central section (58) of the beam (60) of the fixed support (14).

11. The disk brake as claimed in claim 7, wherein each rigid branch (B1, B2, B3, B4) is straight.

12. The disk brake as claimed in claim 7, wherein each rigid branch (B1, B2, B3, B4) includes stiffening means (Z1, Z2, Z3).

13. The disk brake as claimed in claim 7, wherein each plastically deformable bend (P1, P2, P3) includes an area (F1, F2, F3) of weakened mechanical properties.

14. The disk brake as claimed in claim 7, wherein each plastically deformable bend (P1, P2, P3) is a bent portion of a strip including a window (F1, F2, F3) oriented parallel to the first deformation axis (A1).

15. The disk brake as claimed in claim 1, wherein the exterior return spring (48E) is produced in one piece by cutting and shaping a sheet of material.

16. The disk brake as claimed in claim 15, wherein the exterior return spring (48E) is produced in one piece by cutting, pressing and bending a sheet of metal.

17. The disk brake as claimed in claim 7, wherein the rigid branches (B1, B2, B3, B4) and the bends (P1, P2, P3) are produced in one piece by cutting, pressing and bending a strip of constant width.

18. The disk brake as claimed in claim 9, wherein, in a state preceding any plastic deformation of the bends (P1, P2, P3), the first rigid branch (B1) and the second rigid branch (B2) form an angle ($\alpha 1$) equal to the angle ($\alpha 2$) that the second rigid branch (B2) and the third rigid branch (B3) form and equal to the angle ($\alpha 3$) that the third rigid branch (B3) and the fourth rigid branch (B4) form.

19. The disk brake as claimed in claim 1, wherein the exterior return spring (48E) is made from a material selected from a group including stainless steel, X2CrNbCu21 steel, 304L steel, gold, lead, a synthetic material, a synthetic material with a polymer matrix reinforced by natural or synthetic fibers.

20. The disk brake as claimed in claim 1, wherein the exterior return spring (48E) is made from a material the breaking strain of which is between 30% and 60%, the tensile strength of which is between 400 MPa and 1000 MPa and the 0.2% offset strain of which is between 0 and 500 MPa.

21. The disk brake as claimed in claim 20, wherein the exterior return spring (48E) is made from a material the breaking strain of which is between 40 and 60%, the tensile strength of which is between 400 MPa and 700 MPa, and the 0.2% offset strain of which is between 150 and 400 MPa.

22. The disk brake as claimed in claim 21, wherein the exterior return spring (48E) is made from a material the breaking strain of which is between 50 and 60%, the tensile strength of which is between 400 MPa and 600 MPa, and the 0.2% offset strain of which is between 200 and 300 MPa.

23. The disk brake (10) as claimed in claim 1, wherein the exterior return spring (48E) includes a functional plate (70) connected to said front fixing portion (50) that lies in a front plane orthogonal to the sliding axis of the brake piston (46).

24. The disk brake as claimed in claim 23, wherein the exterior return spring (48E) is produced in one piece with said functional plate (70).

25. The disk brake (10) as claimed in claim 1, wherein the exterior brake shoe (18E) includes at least one lateral lug (26) for guiding sliding thereof that is received in an axial slide (28) of the fixed support (14).

26. The disk brake (10) as claimed in claim 24, further comprising a slider (32) that espouses the walls of the slide (28) and is fixed to the fixed support (14).

* * * * *